United States Patent [19]

Chang et al.

[11] Patent Number: 4,492,582

[45] Date of Patent: Jan. 8, 1985

[54] TEACHING AND ENTERTAINMENT DEVICE

[75] Inventors: Richard S. Chang, Rolling Hills Estates; John Y. Ling, Chino; Daniel J. Shoff, Torrance, all of Calif.

[73] Assignee: Mattel, Inc., Hawthorne, Calif.

[21] Appl. No.: 222,847

[22] Filed: Jan. 6, 1981

[51] Int. Cl.³ .................... G09B 7/02; G09B 13/00
[52] U.S. Cl. ........................... 434/169; 434/232; 273/1 E
[58] Field of Search .............. 434/169, 178, 201, 335, 434/307, 43, 228–232; 273/DIG. 28, 237, 238, 85 G, 1 E; 340/323 R, 365 R; 364/410, 419, 200, 900

[56] References Cited

U.S. PATENT DOCUMENTS

| | | | |
|---|---|---|---|
| 3,697,681 | 10/1972 | McCoy | 434/43 |
| 4,051,605 | 10/1977 | Toal et al. | 434/201 |
| 4,093,223 | 6/1978 | Wilke et al. | 273/94 |
| 4,117,607 | 10/1978 | Gill | 434/201 |
| 4,177,462 | 12/1979 | Chung | 273/85 G |
| 4,180,805 | 12/1979 | Burson | 273/85 G |
| 4,232,374 | 11/1980 | Chung et al. | 273/85 G |
| 4,245,405 | 1/1981 | Lien et al. | 434/167 |
| 4,310,839 | 1/1982 | Schwerdt | 340/365 R |

*Primary Examiner*—Vance Y. Hum
*Attorney, Agent, or Firm*—Roy A. Ekstrand; Ron M. Goldman; James G. O'Neill

[57] ABSTRACT

A teaching and entertainment device includes a desktop console which supports a keyboard, an LCD display matrix, and a plug-in cartridge recepticle. A quartet of LCD drivers each control a quadrant of the display under the control of a first microprocessor. A plug-in cartridge is insertable into the console and contains a second microprocessor. Apparatus are provided for establishing a master/servant relationship of the second microprocessor over the first whenever the plug-in cartridge is present.

7 Claims, 9 Drawing Figures

Microfiche Appendix Included
(2 Microfiche, 192 Pages)

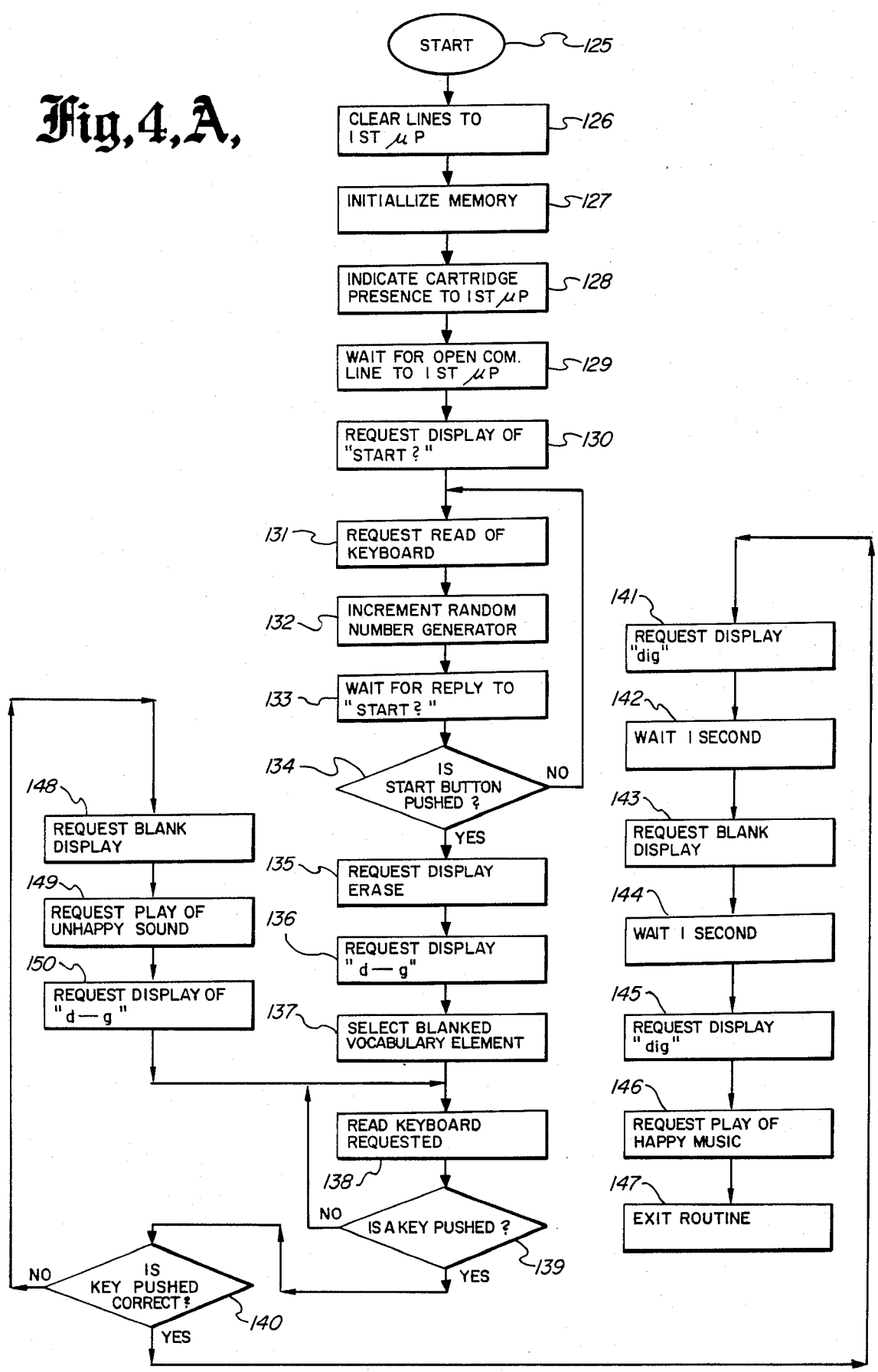
Fig. 4, A,

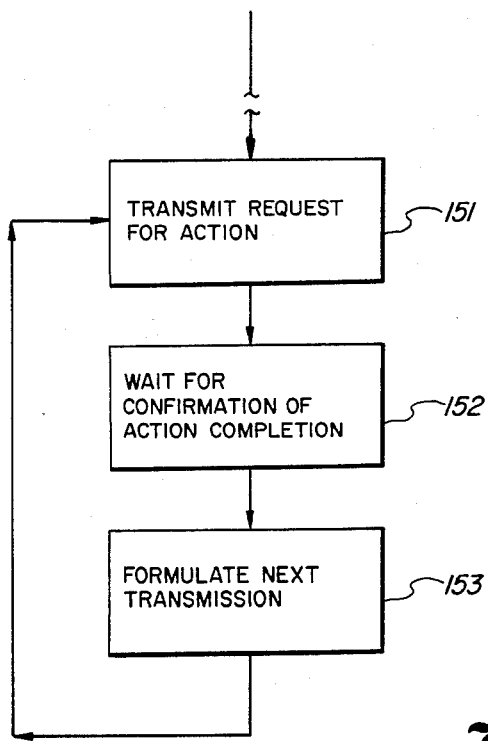
Fig. 4, B.
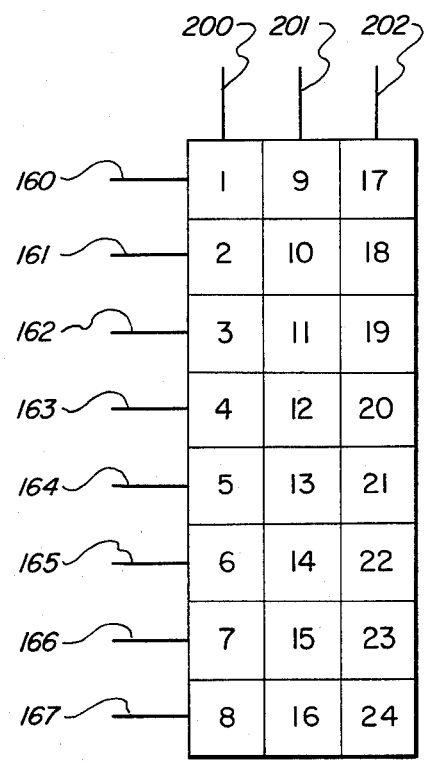
Fig. 5, A.

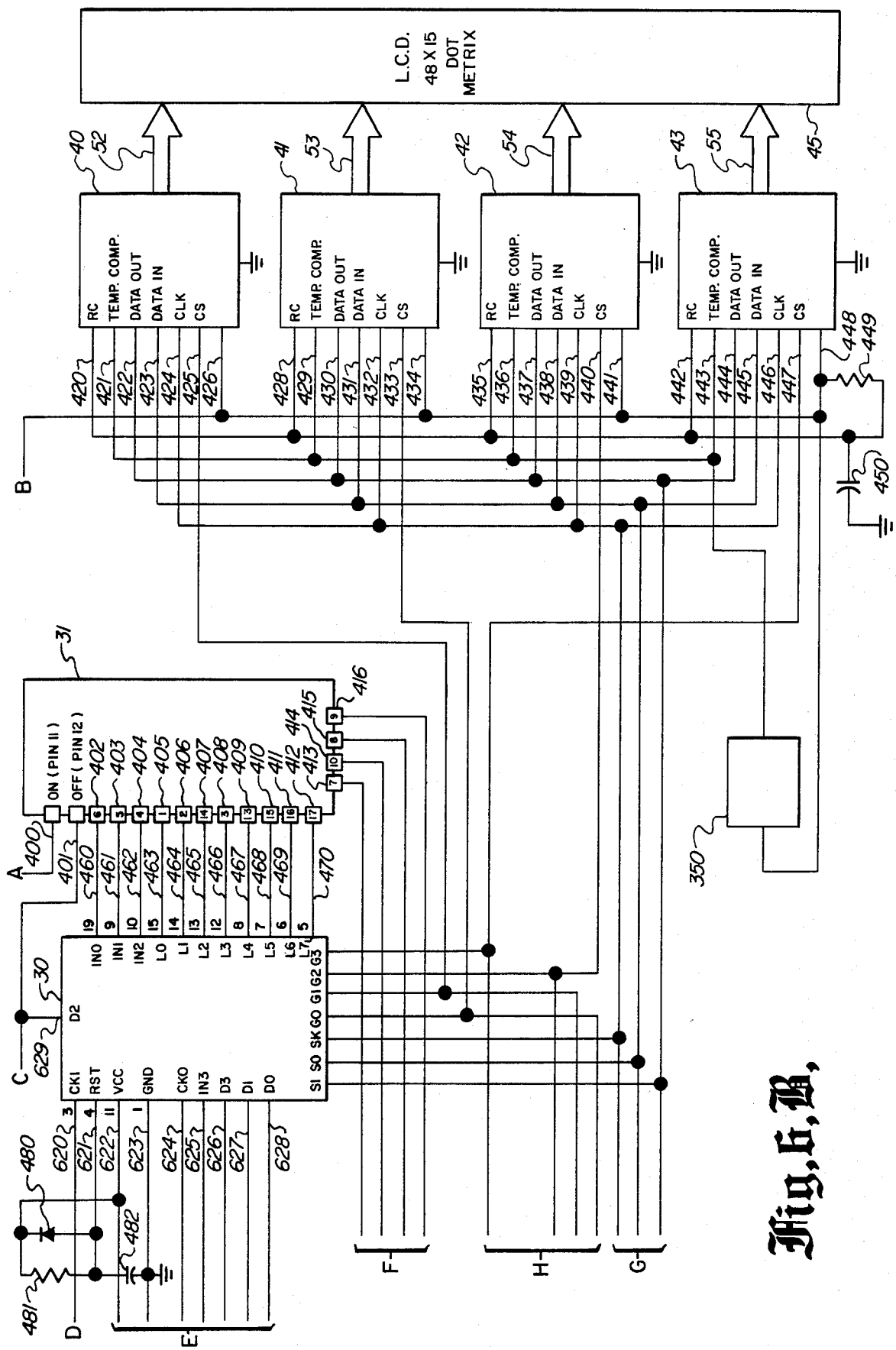

TEACHING AND ENTERTAINMENT DEVICE

A microfiche Appendix is included in this application and is composed of 2 microfiche and 192 frames.

BACKGROUND OF THE INVENTION

This invention relates generally to electronic teaching and entertainment devices and particularly to those in which computing circuits keyboards and displays are inter-related in a desk-top self contained teaching and entertainment unit.

The recent improvements in microprocessor electronics have provided increased flexibility and capability making possible relatively inexpensive consumer computer products leading to the development of numerous varieties of personal computers, hand-held games, and teaching devices. In general, such devices combine a digital electronics circuit with an optical display system usually comprising a liquid crystal display (LCD) or light-emitting diode (LED) array. Generally a number of user operable keys are included to provide user information to the microprocessor computing circuits within the unit. In addition to the hand-held and desk-top type units, a variety of microprocessor based educational and entertainment devices have been developed in which the display system of a television receiver is employed. Such systems are generally more complex, flexible and therefore more costly than the hand-held or desk-top units employing LCD or LED display systems. In addition, television display units typically include the capability to accomodate plug-in cartridges which generally comprise additional memory for programming the internal micro-electronics of the unit to provide a variety of activities or games. While both types of devices hand-held and desk-top as well as the more expensive and complex television display systems have their respective advantages, there remains a need in the art for a system which will provide a flexible multiprogrammable micro electronic computing system having an extensive display system in a form which is lower in cost than television display systems and does not require a television display unit.

OBJECTS OF THE INVENTION

Accordingly, it is a general object of the present invention to provide an improved teaching and entertainment device.

It is a more particular object of the present invention to provide an improved system in which substantial display activity and flexibility can be combined in a relatively inexpensive self-contained unit.

SUMMARY OF THE INVENTION

In accordance with the present invention there is provided a teaching and entertainment device comprising display means including a matrix of individually operable display cells. Each of the display cells are configurable into a selected one of at least two image states and require periodic refreshing to maintain an imposed image state. A plurality of display drivers each including a memory driver periodically refresh the display cells and each are coupled to and control a portion of the display means. Means are provided for displaying a figure at a location on the matrix including portions of the matrix under control of two or more display drivers and a user operably keyboard together with a first microprocessor, which include first microprocessor memory means periodically polls the keyboard and responds thereto to alter the image upon the display means. A plug-in cartridge and a plug-in cartridge receiving means cooperate to make electrical connections to a second microprocessor having second microprocessor memory means which is housed within the plug-in cartridge. The second microprocessor means is electrically compatible with the first microprocessor and cooperates therewith to establish a master-slave relationship between the first and second microprocessors whenever the plug-in cartridge is received by the plug-in receiving means in which the second microprocessor assumes pre-eminence over the first microprocessor and in which the first microprocessor functions to (1) poll the keyboard, (2) present information to the second microprocessor and (3) respond to commands therefrom. Clock means coupled to the first and second microprocessors providing a common periodic clock signal.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

FIGS. 4A and 4B are flow charts of the operation of the plug-in microprocessor;

FIGS. 5 and 5A are details of the present invention display matrix; and

FIGS. 6A and 6B are a detailed schematic of the present invention teaching and entertainment device.

DESCRIPTION OF THE PREFERRED EMBODIMENT

Figure 1:
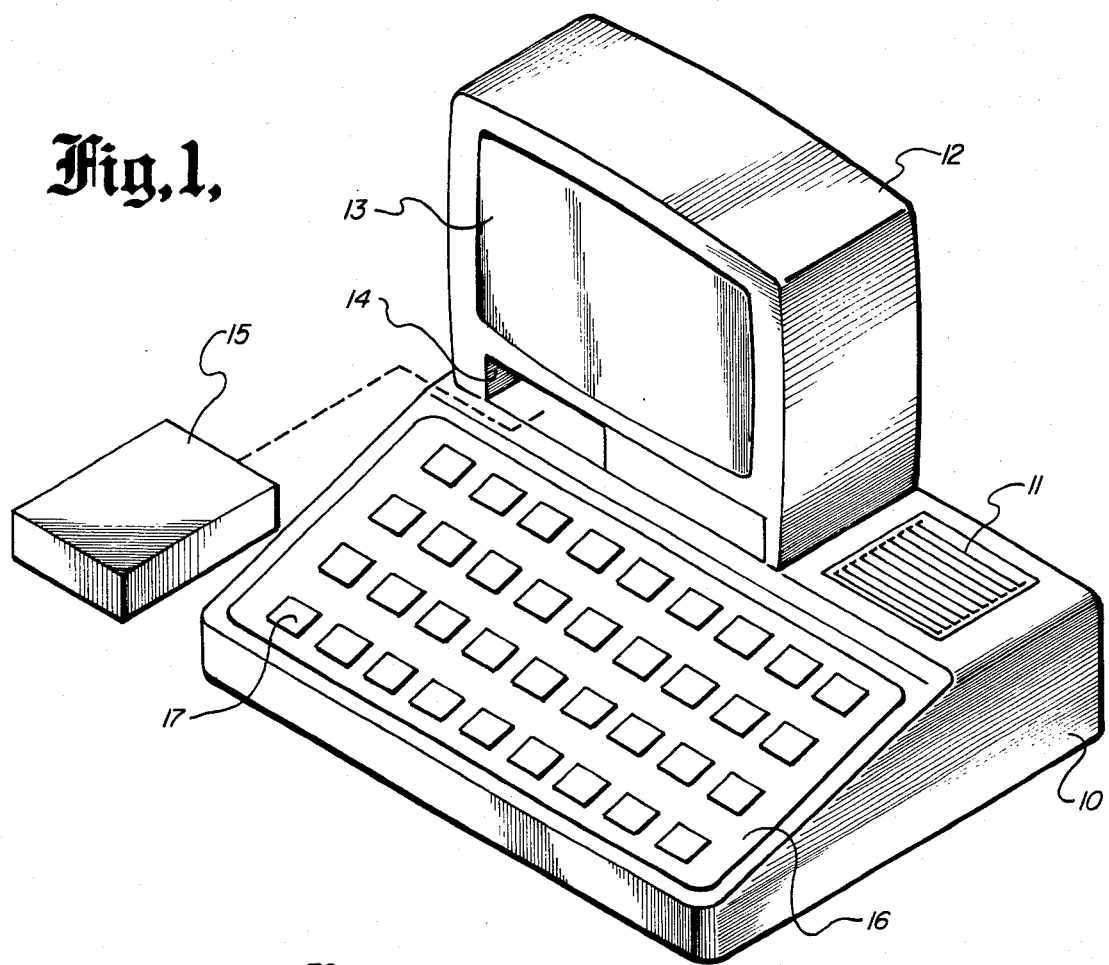
FIG. 1 is a perspective view of a teaching and entertainment device constructed in accordance with the present invention.

FIG. 1 is a perspective view of a teaching and entertainment device constructed in accordance with the present invetion in which a housing 10, preferably formed of a plastic or other non-conducting material, supports a speaker assembly 11 and an upper display portion 12. A multisegment display matrix 13 is supported in a substantially vertical position by console portion 12. A keyboard 16 is supported by housing 10 and includes a plurality of user operable keys 17. A plug-in receiving means 14 is formed in a frontal portion of housing 10 and a plug-in receiving means 14 (shown removed from housing 10) may in accordance with the invention be inserted in receiving means 14.

By means described below in greater detail, the user operation of the present invention teaching device proceeds when a selected one keys 17 is pressed. The character and the sequence of events con-trolling the exchange of information between the present invention device and the user which is to great extent a matter of some flexibility as will be seen below, is controlled primarily by the stored program within the micro-computer. However, in general most information exchanges will proceed with an initial inquiry from the device in which a selection of mode is requested from the user. Most typically, a graphic display appearing which is often accompanied by an alerting sound proceeds across display 13 in response to which the user selects a specific mode of information exchange by depressing a selected one of keys 17. Upon depression of a selected key requesting a specific mode of operation, the circuitry within the unit by means described below in greater detail initiates the selected activity. Thereafter, depending again upon the character of activity selected a sequence of information exchanges between the teaching device and the user is initiated. While the varieties of activities are many and varied the majority are likely to have the foregoing steps in common. Therefor for purposes of illustration a simple teaching routines will be discussed in which the first and last letters of a three letter word are supplied by the machine and which require the addition of an appropriate middle letter to form a word. In such a routine the first and last letters of the three letter word will appear upon display 13 separated by a distance appropriate for the insertion of the "missing" letter. Upon seeing the display for example "d_g" the user then attempts to depress a key having an alphabet character thereon. The selected letter appears within the middle of the two letters of the display. After the third letter is supplied a determination within the unit as to whether the three letter combination thus formed comprises one of the pre-selected words acceptable to the machine occurs. If an acceptable word is formed, in this example an "i" input, an indication of correctness is supplied either on the display or by the sound generating circuit or the combination of the two. Alternatively, if the three letter combination does not form an acceptable word (i.e. letter "b") an indication of error is produced either by display sound, or a combination of the two and the same two letters are once again presented separated by a vacant space and the user is encouraged to attempt another selection.

The foregoing example activity may be found on a given plug-in cartridge. In the event that the user desires to participate in another type of information activity, a different cartridge 15 may be inserted in receiving means 14 which by means described below will configure the electronic system within the unit to provide a different group of activities.

Figure 2:
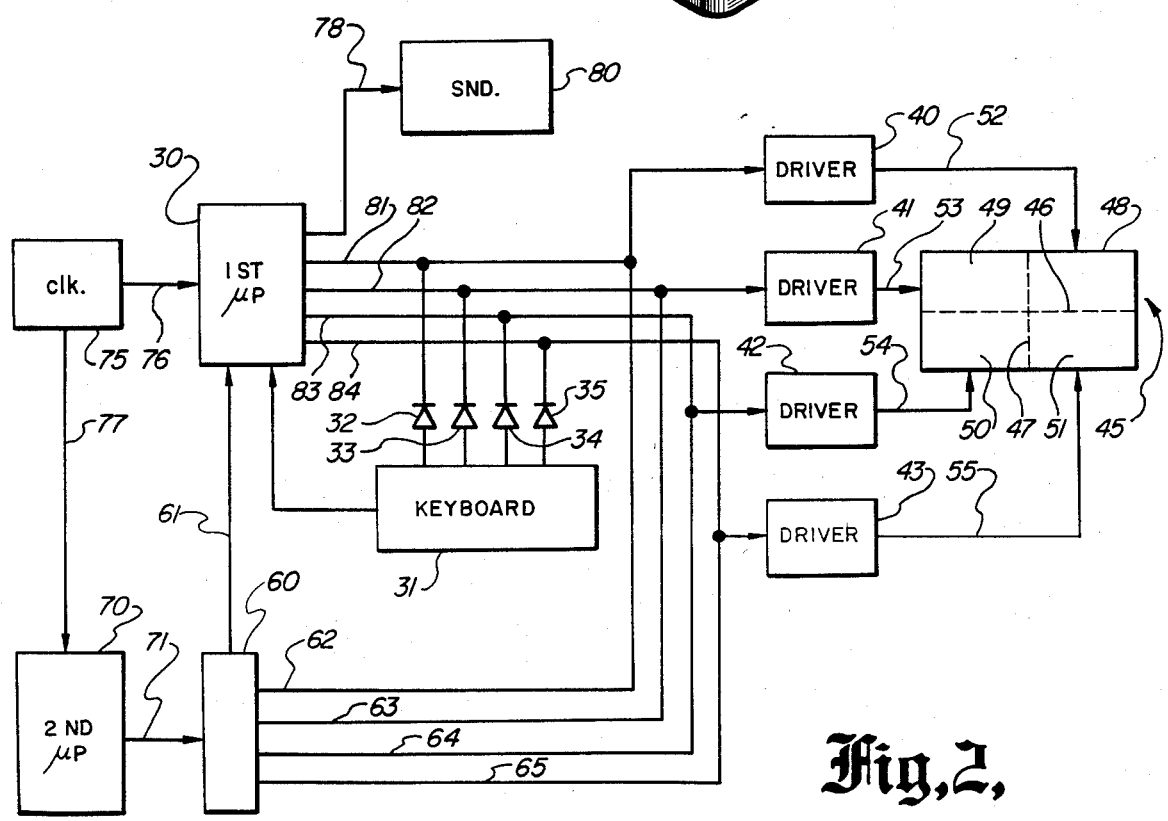
FIG. 2 is a block diagram of a teaching and entertainment device constructed in accordance with the present invention.

FIG. 2 sets for a block diagram representation of a teaching and entertainment device constructed in accordance with the present invention. A first microprocessor 30 which is located within housing 10 (see FIG. 10) has a communication line 78 coupled to a sound generating circuit 80 and a plurality of data output lines 81, 82, 83 and 84. A quartet of binary driver circuits 40, 41, 42 and 43 are coupled to data output lines 81 through 84 respectively and have output lines 52, 53, 54 and 55 respectively. A liquid crystal display comprising a matrix of liquid crystal display cells (LCDs) 45 is coupled to output lines 52 through 55 respectively. In a manner explained below in greater detail, a four-part division of display 45 defined by dotted lines 46 and 47 creates quadrant regions 48, 49, 50 and 51 which are individually coupled to drivers 40, 41, 42 and 43 respectively by data lines 52, 53, 54 and 55 respectively. Each of drivers 40 through 43 is coupled to and produces display portions upon its respective quadrant of the total LCD display. A keyboard 31 is coupled to first microprocessor 30 and to display drivers 40 through 43 by diodes 32, 33, 34 and 35 respectively. A second microprocessor 70 has a data line 71 coupled to a plug-in receiving unit 60 which includes data lines 62, 63, 64 and 65 coupled to drivers 40 through 43 respectively. Plug-in receiving unit 60 also provides a communication line 61 to microprocessor 30 whereby microprocessor 70 and microprocessor 30 can exchange a plurality of signals. A clock circuit 75 provides a source of periodic clock signals which are coupled to first microprocessor 30 by a communication line 76 and to second microprocessor 70 by a communication line 77.

Figure 3:
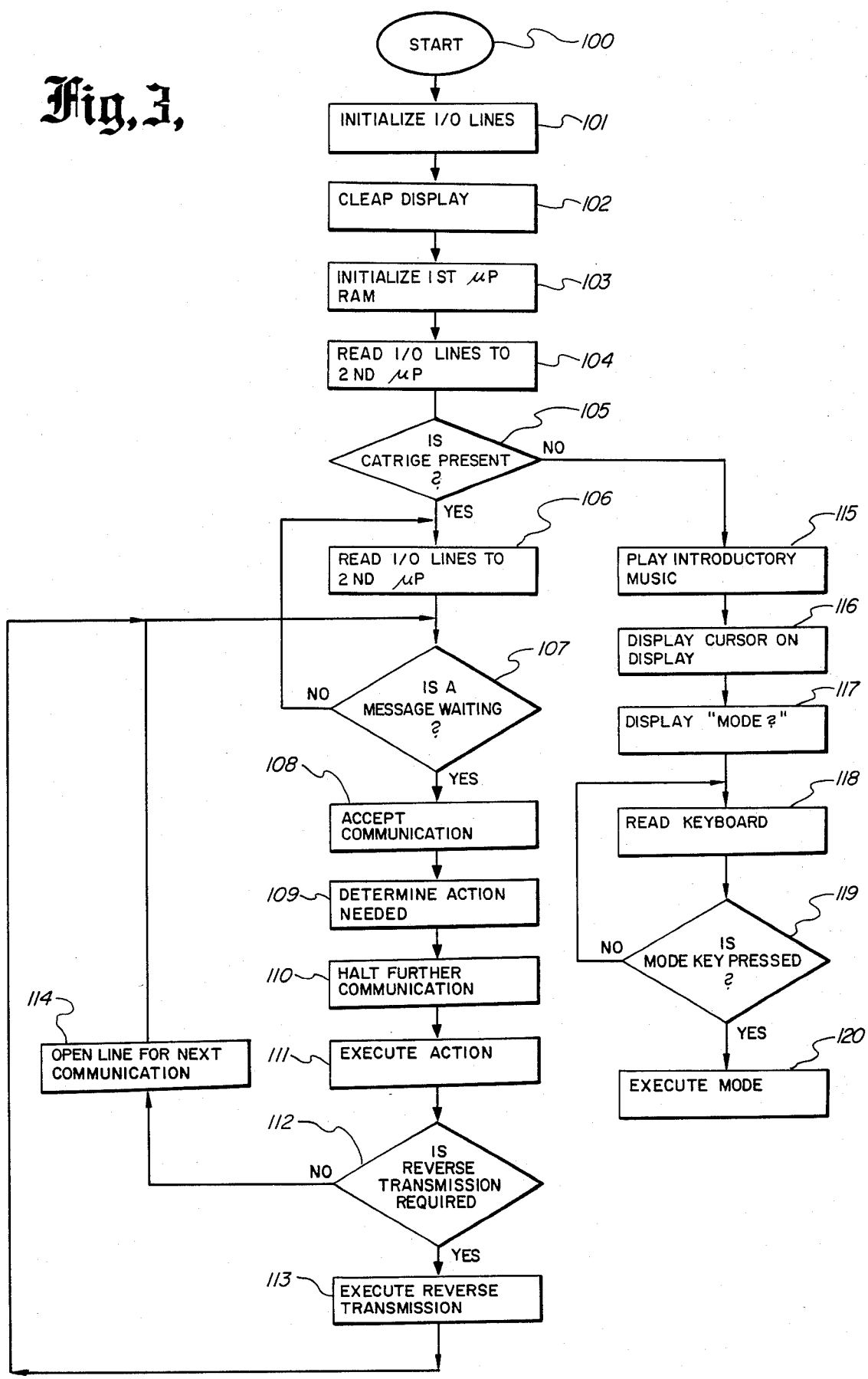
FIG. 3 is a flow chart of the operation of the first microprocessor.

The block diagram representation set forth in FIG. 2 will be recognized by those skilled in the art as a functional representation rather than a detailed schematic drawing of all electrical connections. It will also be apparent to those skilled in the art that the communication lines shown as single connections in FIG. 2 in most instances represent multiple electrical connections whereby multiple binary digits may be simultaneously exchanged. While the operation of the present invention system can be amply understood by resort to FIG. 2 in combination with the flow charts set forth in FIGS. 3, 4A and 4B below together with the discussion in conjunction therewith, in the interest of clarity, the operational and construction details of the present invention system are further set forth in detailed schematic form in FIG. 6 and described in great detail in the appended source code. The discussion which follow in conjunction with FIGS. 2, 3, 4A and 4B are set forth to provide an overall view of the operation of the present invention teaching and entertainment system. However it will be apparent to those skilled in the art that many of the steps performed in the flow charts FIGS. 3, 4A and 4B are in themselves routines or sub-routines which are also capable of flow chart depiction. While these details are amply set forth in the microfiche apparatus, it is believed that the interest of clarity is best served by the description of overall circuit function which follows.

In accordance with an important aspect of the present invention, first microprocessor 30 operates in either of two modes. In the first mode characterized by the absence of second microprocessor 70, first microprocessor 30 carries out poling of keyboard 31. That is, microprocessor 30 "monitors" keyboard 31 and remains ready to receive operator information in the form of key selection. Prolonged absence of key selection causes a routine within microprocessor 30 to be carried forth in which an alert tone is sounded and the device turns off. If a key or keys are timely pressed, microprocessor 30 controls display drivers 40 through 43 and sound generator 80 responds to keyboard functions and establishes and maintains a display cursor. In the first made, (i.e. microprocessor 70 absent) microprocessor 30 is in control of the entire system.

In the event that a plug-in cartridge in inserted in receiving means 60 which includes second microprocessor 70, the second mode of operation is entered in which the function of microprocessor 30 is altered in accordance with an important aspect of the present invention. Once microprocessor 70 is present, a communication indicating its presence is sent from microprocessor 70 to microprocessor 30 which causes microprocessor 30 to cease directly controlling the display and sound functions of the system of its own initiative. Microprocessor 30 instead switches to an operation in which it is slaved to microprocessor 70. Thereafter under this newly established master-slave relationship, microprocessor 70 assumes master control of the system and microprocessor 30 operates in a format whereby it accepts information from keyboard 31 and presents it to microprocessor 70 then waits for instructions from microprocessor 70 as to the next function if any to be carried forth on the display or in the sound circuit.

Microprocessor 70 includes sufficient memory capacity and internal logic programming to permit it to control first microprocessor 30's activation of the display and sound systems in a manner consistant with a preprogrammed set of instructions or logic in order to expand the total system operation. The timing of the two microprocessors is maintained by the common clock signals produced by clock 76 which includes well-known circuitry for the production of precise periodic signals. As described below in greater detail, drivers 40 through 43 each maintain their respective quadrants of display 45. Keyboard 31 permits user interaction with the system while microprocessors 30 and 70 cooperate in the above described manner to carry forth the operations required for a selected activity.

FIG. 3 sets forth a flow diagram for the basic operation of first microprocessor 30 in which a start step 100 is entered in response to a power-on of the system. From step 100 the program proceeds to step 101 in which the input and output lines of microprocessor 30 are initialized. Thereafter the program next proceeds to a step 102 in which the display is cleared following which the program proceeds to a step 103 in which the first microprocessor 30 random access memory is initialized. In the next program step 104, the input and output lines to the second microprocessor 70 are read. Thereafter a decision step 105 is entered in which a determination of cartridge presence is made. In the event that no cartridge is present, the program branches to step 115 in which an introductory musical tune is played over sound circuit 80. Thereafter, the program proceeds to a step 116 in which the cursor is displayed on image display 45. Next, at step 117, the system requests a mode selection input from the user by displaying "mode ?" upon the display after which the program proceeds to step 118 in which the output of keyboard 31 is read. After the reading of keyboard 31 in read step 118, a decision step 119 is entered in which it is determined whether a proper mode key has been pressed. In the event that a proper mode key has not been pressed, the program returns to the input to step 118 and the keyboard is again read. This process continues until an acceptable mode key is pressed in which case a yes response to the decision in step 119 causes the program to branch to step 120 in which the selected mode is executed. The nature of mode operation in step 120 is a matter of programmer choice and may for example include a "typewriter" mode in which individual alphanumeric characters on the keyboard are displayed on display 45 in the order received. This allows the user to formulate words and images upon the display. It will be apparent that other simple modes of operation can be executed during step 120 in response to differing keyboard inputs at step 118 by providing the appropriate memory and logic within microprocessor 30.

Returning now to decision step 105 of the program in which the negative option of cartridge presence has been pursued we now consider the progress of the program in response to an affirmative response (that is an indication of cartridge presence). With a cartridge present, the program proceeds to step 106 in which the input and output lines of microprocessor 70 are read and the program enters a decision step 107 in which an assessment is made as to whether a message is waiting on the output line of microprocessor 70. In the event no message is waiting the program returns to step 106 and again reads the output lines of second micrprocessor 70. If a message is waiting at step 107 the program proceeds to step 108 in which the communication from microprocessor 70 to microprocessor 30 is accepted. The program then moves to step 109 in which microprocessor 30 determines the action required in response to command received in step 108. Next, a step 110 is entered in which further communications between the two microprocessors is temporarily halted following which a step 111 is entered in which the action requested is executed by microprocessor 30. Following the execution of the requested action in step 111, the program proceeds to a decision step 112 in which it is determined whether a reverse transmission, that is a transmission from microprocessor 30 to microprocessor 70 is required. If no transmission is required, the program branches to a step 114 in which the communication line between the two microprocessors is opened for the reception of the next communication. Thereafter the program returns to decision step 107 and awaits the next message. If at step 112 a reverse transmission is found to be required, the program branches to a step 113 in which the reverse transmission is executed. Thereafter the program again returns to step 107.

As can be seen in FIG. 3 the overall function of microprocessor 30 is to first determine whether a cartridge is present. If no cartridge is present microprocessor 30 moves to a mode of operation in which it is dominate in the system. However, if a determination is made that a plug-in cartridge (which includes microprocessor 70) is present, a second mode is entered in which microprocessor 70 controls the operation of microprocessor 30 in a master-servant relationship. In this relationship microprocessor 30 presents information to microprocessor 70 and then awaits commands, or requests, to execute specific functions and thereafter returns to a waiting state whereupon microprocessor 70 can issue the next requested action in accordance with its own program. The foregoing discussion relevant to FIG. 3 set forth the flow chart of microprocessor 30. However the complete operation of the present invention system is best obtained by including discussions of the operation of microprocessor 70 to complete the reader's understanding of the entire system.

FIGS. 4A and 4B set forth the other half of the present invention microprocessor systems in which the flow chart for the second microprocessor 70 is set forth. A start step 125 which includes activation or "powering-on" of the system with a cartridge inserted in plug-in recepticle 60 begins the program at step 125. Thereafter, the program proceeds to a step 126 in which the lines to microprocessor 30 are cleared. The program next proceeds to a step 127 in which the memory of second microprocessor 70 is initialized. In the next step of the program, (step 128) microprocessor 70 indicates its presence to microprocessor 30. After the indication of second microprocessor presence in step 128, a pause step 129 is entered in which microprocessor 70 waits for an open communication line to microprocessor 30. Once an open line is found in step 129, the program proceeds to step 130 in which a request is made by microprocessor 70 that microprocessor 30 display "start ?". It should be noted at this point that in all steps of the following program in which a request is made by microprocessor 70 that microprocessor 30 perform a specified function involve the three substeps shown in FIG. 4B. Specifically a step transmitting a request for action 151 is followed by a pause step 152 in which microprocessor 70 waits for confirmation from microprocessor 30 that the requested action has been completed. Thereafter step 153 is entered in which microprocessor 70 formulates the next transmission to microprocessor 30. Next a request for action is transmitted. Returning now to the step 130 in which a request for the display of a "start ?" was performed, the program next moves to a step 131 in which microprocessor 70 requests that microprocessor 30 read the outputs of keyboard 31. The program then enters step 132 in which a random number generator is incremented one increment. The importance of random number generation will be explained below in greater detail. However, suffice it to say at this point that in order to provide a lack of predictability and therefore increase educational capability and player excitement certain functions within the teaching system are implemented in accordance with random number. After incrementing the random number generator in step 132, the program enters step 133 in which a pause sufficient to allow time for a keyboard key to have been pressed is implemented. Thereafter, the program moves to a decision step 134 in which it is determined whether the start button has been pushed. If the start has not at that point been pushed, the program branches back to step 131 in which the keyboard is again read. There is between steps 131, 132, 133 and 134 a loop formed in the program in which cycling of keyboard reading and random number generator incrementing takes place repetitively until a start button is pushed. Once a start button is pushed, the program exits step 134 and proceeds to step 135 in which a request for clearing of the display is made. For purposes of explanation, the example activity set forth above in which a pair of letters spaced by a blank is presented to the user and attempts at filling in the correct letter are solicited is continued. It will be readily apparent to those skilled in the art that numerous other example activities could have been selected without departing from the spirit and scope of the present invention. It will be equally apparent that the simple activity selected is chosen for purposes of explanation and that the present invention system performs many learning activities and games of a much more complex nature. Accordingly, the program next proceeds to step 136 in which microprocessor 70 requests the display of "d_g" following which the program proceeds to step 137 in which the number accumulated in random generator by the above described successive loopings of steps 131 to 134 is used to select the appropriate blanked vocabulary element. The program next proceeds to step 138 in which microprocessor 30 is requested to read the keyboard. The program then enteres a decision step 139 in which a determination is made as to whether a key has been pushed. If no key has been pushed at this point, the program loops back to step 138 and again reads keyboard 31. If a key has been pushed, the program proceeds to a decision step 140 in which it is determined whether the key pushed is correct. If an incorrect key has been pressed the program then branches to a step 148 in which microprocessor 70 requests a blanking of the display followed by a step 149 in which microprocessor 70 requests the playing of a "unhappy" sound. The program then proceeds to a step 150 in which it is again requested to display "d_g". Thereafter, the program loops back to step 138. If the response to the inquiry in decision step 140 is affirmative (that is the correct key has been pushed) for example by the insertion of the letter i in the blank of "d_g" the program proceeds to step 141 in which microprocessor 70 requests the display of "d_g". At the next step in the program (step 142) is a one second pause followed by a step 143 in which it is requested to blank the display. Thereafter, the program proceeds to a second pause step 144 afterwhich the system again requests display of "dig". The program next proceeds to step 146 in which a request is made to play "happy" music. Following step 146 the program either proceeds to exit the routine at step 147 or returns to step 135 and selects a new word.

Figure 5:
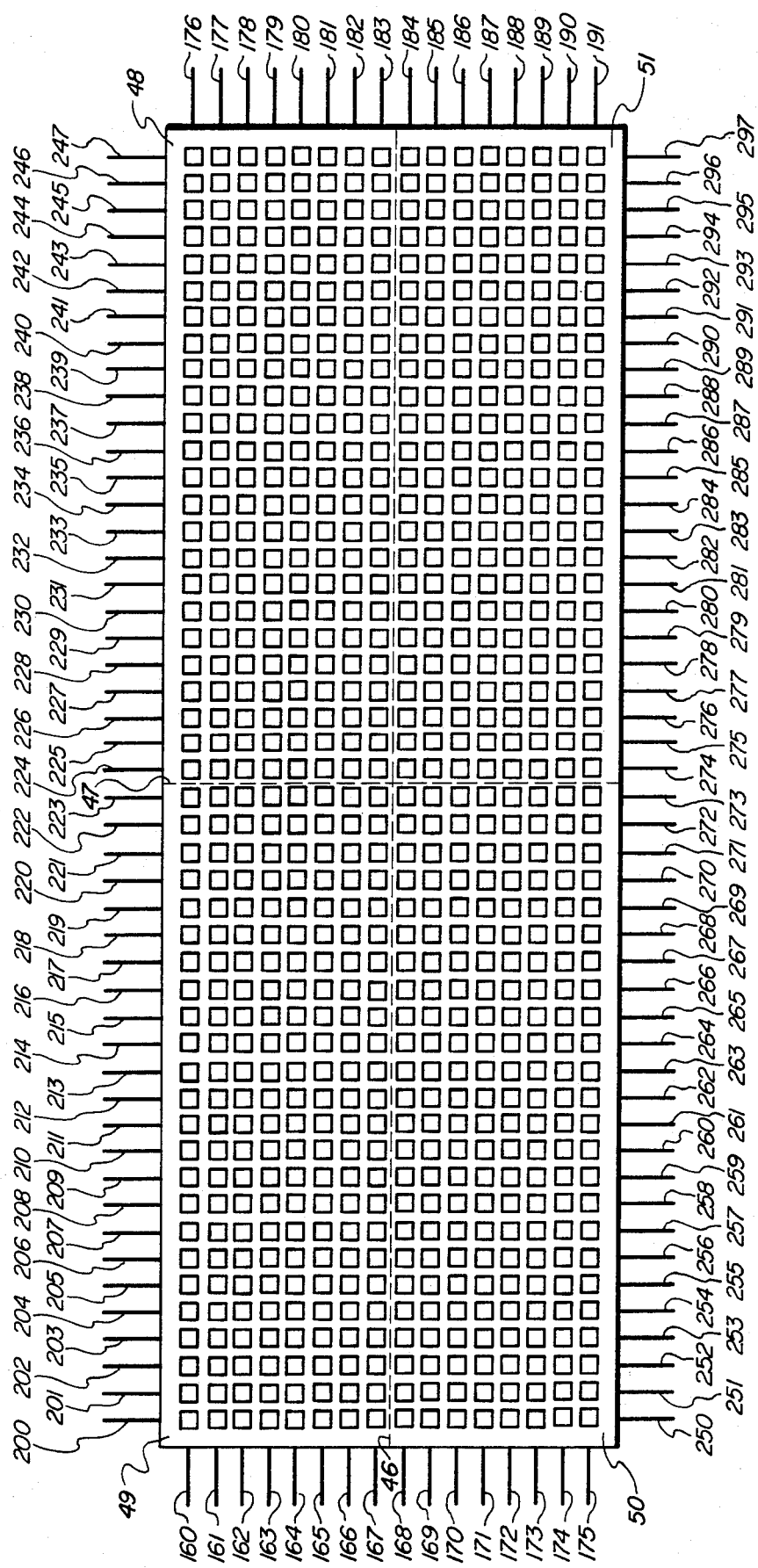

Turning now to FIG. 5, a detailed drawing of the display system of the present invention is set forth. Liquid crystal display 45 comprises a rectangular array of individual display cells arranged in a matrix of sixteen rows and forty-eight columns. Each cell within the matrix is individually controlled by a cartesian organized set of electrodes. In accordance with an important aspect of the present invention, display 45 is multiplexed that is each quadrant of display 45 (defined by dashed lines 46 and 47) includes eight row electrodes and twenty-four column electrodes. The unique identification of each display cell within the matrix comprises a row and column intersection. For example, quadrant 49 is controlled by a plurality of row electrodes 160 through 167 and a plurality of column electrodes 200 through 223. Since each position within quadrant 49 is uniquely defined by the combination of one row and one column a given cell can be controlled by a pair of electrodes. For example, cell 300 is uniquely defined as that cell having in common row electrode 160 and column electrode 201. Similarly, cell 301 is defined as the cell responsive to row electrode 160 and column electrode 202. Further, electrode 203 is responds to row electrode 163 and column electrode 201 and so on. As can be seen, any cell within the quadrant 49 can be uniquely defined as that cell which has in common a selected one of row electrodes 160 through 167 and a selected one of column electrodes 200 through 223. Similarly of course, any cell within quadrant 48 of display 45 is uniquely defined by a selected on of row electrodes 176 through 813 and a selected column electrode 224 to 247. The same is of course true for quadrants 40 and 51. The advantage of such multiplexing is ease of addressing. In the present embodiment, 768 cells (i.e. 16×48) are addressed by 128 electrode pairs.

In accordance with an important aspect of the present invention, each quadrant of display 45 is exclusively controlled by one of the LCD drivers 40 through 43. That is quadrant 48 is controlled solely by driver 40 which means that row electrodes 176 through 183, and column electrodes 224 through 247 are coupled to driver 140. Quadrant 49 is controlled by driver 41 through electrodes 160 through 167 and electrodes 200 through 223 and so on. Within each quadrant, the present invention system organizes the matrix information in a manner in which readily facilitates the display of image components which traverse one or more the boundary lines 46 and 47 separating the respective quadrants for each driver cirucit. Each quadrant of the display matrix is further divided into eight groups having three columns and eight rows each. In other words, quadrant 49 is divided into a first group formed by columns 200 201 and 202 a second group formed by columns 203, 204 and 205 and so on. Within each group, the invidual cells are numbered from top to botton in each column and from left to right. FIG. 5A shows the extreme left-hand group of quadrant 49 of the LCD display. As can be seen, the cells within the extreme left column of the group are numbered dequentially one through eight from the upper left-hand cell formed by the combination of electrodes 160 and 200 to the lower left-hand cell formed by the combination of electrodes 200 and 167. The cells in the next column are numbered 9 through 16 and controlled by electrodes 160 thru 167 in combination with electrode 201. Finally, the extreme right hand column of the group are numbered seventeen through 24 and are controlled by electrodes 160 through 167 in combination with electrode 202. Each group within the display is organized in the same manner, that is, three columns and eight rows.

An important aspect of the present invention is carried forth by the manner in which the display system organized as set forth above is controlled. The details of display control are set forth in detail in the appended program code with sufficient clarity to enable those skilled in the art to carry forth the present invention. Suffice it to say here that the display is controlled in the following manner. For purposes of explanation the situation involved in the display of an alpha character (i.e. "A") at a point on display 45 in which quadrants 49 and 50 are utilized is shown. This condition is met by a character placed such that portions are found both above and below dash line 46.

The initial operation requires that microprocessor 30 make a determination of the character's location. Next, microprocessor 30 calls the structure of the character from its own memory. In accordance with its programmed code, microprocessor 30 then examines the character and its location to determine the three portion argument for each dot in the character. The microprocessor then determines the affected group within each affected quadrant of display 45 and on a group by group basis proceeds to read out the data of each group in a column by column sequence. Microprocessor 30 then examines the content of this sequential data stream for a group and configures it to that required for character display. The configured data stream for the group is then written into the display preserving data sequence. Whereupon microprocessor 30 then proceeds to the next location and repeats the foregoing operation until the complete character is displayed.

As can be seen, the present invention system of display control readily facilitates what would otherwise be an extremely time consuming and complex operation which arises whenever a character traverses the boundary between regions of the display controlled by different display drivers. The exemplary condition of an alpha "A" character display is, of course, a simple one. However, it will be apparent to those skilled in the art that the present invention display control system makes possible dynamic object depiction including the movement across driver control requirements of the display. In the absence of the present invention system each move of a character or addition of a character would require an initial determination of boundaries and the implementation of a complex algorithm.

Figure 6A:
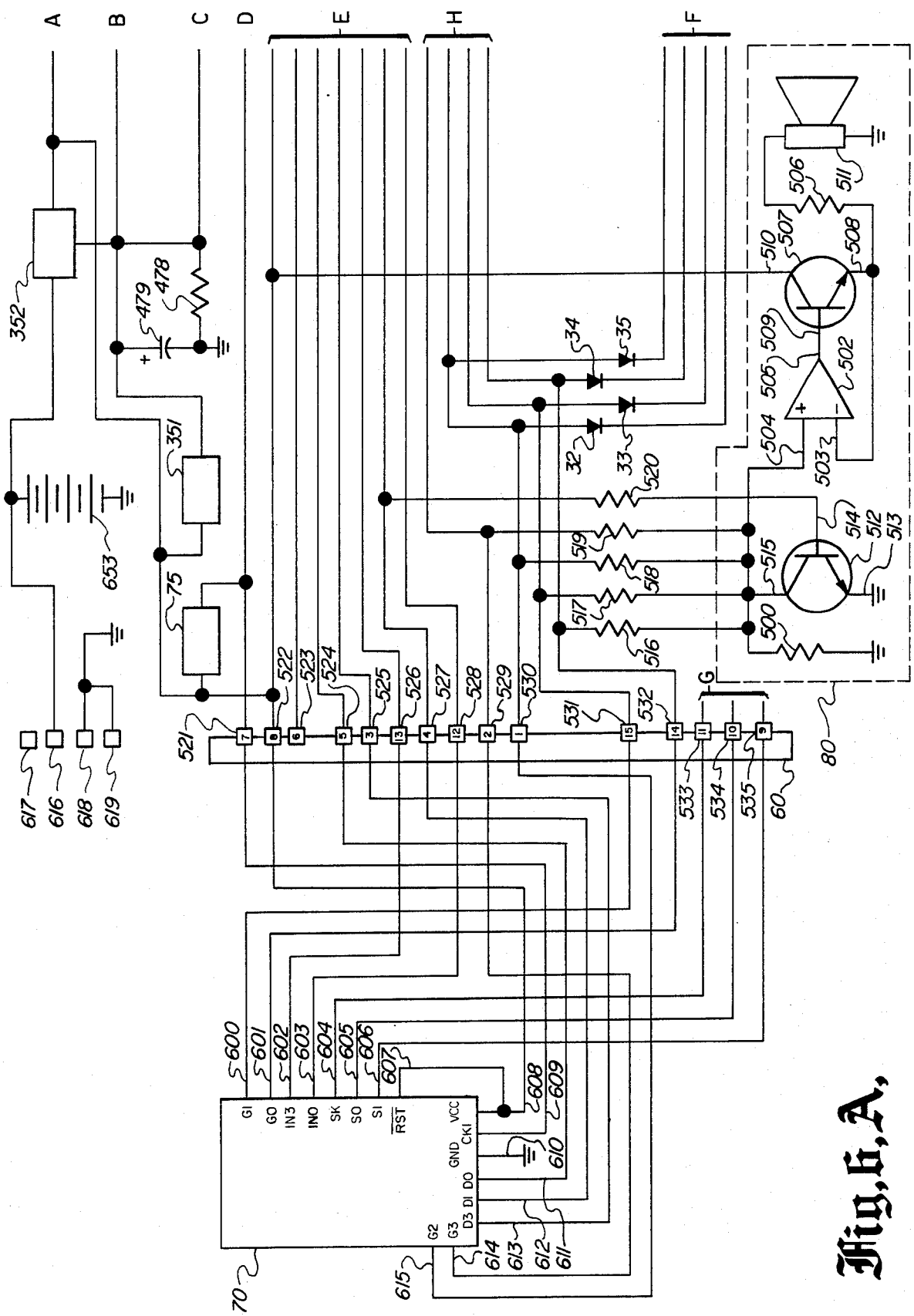

FIGS. 6A and 6B set forth a schematic detail of a teaching and entertainment device constructed in accordance with the present invention. Keyboard 31 comprises a matrix of switches constructed in accordance with well-known principals of keyboard construction. For example, keyboard 31 may comprise a plurality of individual keys each selectively operating a specific switch within the matrix. Or, in the alternative, keyboard 31 may comprise the newly developed structure in which a pair of plastic overlays each having a screened-on conductive matrix overly each other and are separated by a foramenous plastic mask. Keyboard 31 includes an on key 400 which is connected to a voltage regulator 352 an off key 401 which is connected to voltage regulator 352. Keyboard 31 also includes a plurality of communication lines 402 through 416 each of which shall be understood to be connected to a respective portion of the switch matrix of keyboard 31. A first microprocessor 30 includes a trio of input terminals 460, 461 and 462 respectively, coupled to keys 402, 403 and 404 of keyboard 31, and a plurality of input/output lines 463 through 470 connected to terminals 405 through 412 respectively of keyboard 31. Microprocessor 30 also includes a plurality of output terminals 626, 627, 628 and 629, an input terminal 625, a clock terminal 624, a ground terminal 623, a power supply input terminal 622, a reset terminal 621, and a clock terminal 620. Microprocessor 30 further includes a plurality of input-/output terminals 471, 472, 473 and 474, a serial clock terminal 475, a serial output terminal 476, and a serial input terminal 477. A resistor 478 is coupled between terminals 629 of microprocessor 30 and ground, and terminal 629 is further coupled to terminal 401 of keyboard 31. A diode 480 has an anode electrode connected to terminal 621 and a cathode electrode connected to terminal 622. A resistor 481 is coupled inpa rallel with diode 480 and a capacitor 482 is coupled between terminals 621 and 623 of microprocessor 30. A plurality of input power supply terminals 616 through 619 are provided. Terminals 616 and 617 are commonly coupled as are terminals 618 and 619. The latter are connected to ground. A battery 353 has a negative electrode connected to ground and a positive electrode connected terminals 616 and 617. A voltage regulator 352, which should be understood to comprise any of the many well-known circuits, has an input terminal coupled to the positive electrode of battery 353 and an output terminal coupled to terminal 400 of keyboard 31. Regulator 352 is also coupled to terminal 629 of microprocessor 30. A standard DC-to-DC converter 351 is coupled to the output of voltage regulator 352 and provides an increased DC potential which is filtered by a filter capacitor 479. A clock circuit 75 has an input coupled to terminal 622 of microprocessor 30 and an output coupled to terminal 620 thereof. A display driver 40 has an RC terminal 420, a temperature compensation input 421, a data output terminal 422, a data input terminal 423, a clock input terminal 424, a terminal 425, and a supply terminal 426. A LCD driver 41 includes a RC terminal 428, a temperature compensating input terminal 429, a data output terminal 430, a data input terminal 431, a clock terminal 432, a terminal 433, and a supply terminal 434. A display driver 42 includes an RC terminal 435 a temperature compensation input terminal 436, a data output terminal 437, a data input terminal 438, a clock input terminal 439, a terminal 440, and a power supply input terminal 441. A display driver 43 has an RC terminal 442, a temperature compensation terminal 443, a data output terminal 444, a data input terminal 445, a clock input terminal 446, a terminal 447, and a supply input terminal 448. A resistor 449 and a capacitor 450 are series coupled between terminal 448 and ground. Terminals 448, 441, 434 and 426 are commonly coupled to DC-to-DC converter 351 at the junction of capacitor 479. The junction of resistor 449 and capacitor 450 is connected to RC terminals 442, 435, 428 and 420 of drivers 43, through 40 respectively. A temperature compensation circuit 350 which comprises circuitry well-known in the art provides therein a voltage which varies inversely with temperature to the temperature characteristic of the LCD cells within display 45 has an input terminal coupled to terminal 448 and an output terminal coupled to emperature compensation terminals 421, 429, 436 and 443 of drivers 40 through 43 respectively. Data output terminals 422, 430, 437 and 444 are commonly connected to terminal 477 of microprocessor 30. Data input terminals 423, 431, 438 and 445 of drivers 40 through 43 respectively are commonly coupled to serial output terminal 476 of microprocessor 30. Clock terminal inputs 424, 432, 439 and 446 of drivers 40 through 43 respectively are commonly coupled to serial clock terminal 475 of microprocessor 30. Terminal 425 of driver 40 is connected to input/output terminal 473 of microprocessor 30. Terminal 433 of driver 40 is connected to terminal 474 of microprocessor 30 and terminal 440 of driver 42 is connected to terminal 472 of microprocessor 30. Terminal 447 of driver 43 is connected to terminal 471 of microprocessor 30. An LCD matrix 45 includes a 48 by 16 dot matrix of liquid crystal display cells arranged and controlled in accordance with FIG. 5 of the present invention. Drivers 40 through 43 include a plurality of output communication lines 52, 53, 54 and 55 each forming multiple connections to a respective quadrant of display 45 in the manner set forth in FIG. 5 and the discussions accompanying. A plug-in cartridge receiving means 60 includes a plurality of connection terminals 521 through 535 inclusive. A plug-in microprocessor 70 includes a plurality of input/output terminals 600, 601, 615 and 614, a ground terminal 610, a clock input terminal 609, a supply voltage input terminal 608, a reset terminal 607, a serial input terminal 606, a serial output terminal 605, a serial clock terminal 604, input terminals 602, 603 and a plurality of output terminals 611, 612 and 613.

Terminal 521 is connected to terminal 609 of microprocessor 70 and 620 of microprocessor 30. Terminal 522 of plug-in 60 is connected to terminal 608 of microprocessor 70 and terminal 622 of microprocessor 30. Terminal 523 is connected to ground and to terminal 623 of microprocessor 30. Terminal 524 is connected to terminal 611 of microprocessor 70 and terminal 624 of microprocessor 30. Terminal 525 is connected to terminal 613 of microprocessor 70 and terminal 625 of microprocessor 30. Terminal 526 is connected to terminal 602 of microprocessor 70 and terminal 626 of microprocessor 30. Terminal 527 is connected to terminal 612 of microprocessor 70 and to terminal 627 of microprocessor 30. Terminal 528 is connected to terminal 603 of microprocessor 70 and terminal 628 of microprocessor 30. Terminal 529 is connected to terminal 614 of microprocessor 70 and terminal 471 of microprocessor 30. Terminal 530 is connected to terminal 615 of microprocessor 70 and terminal 472 of microprocessor 70. Terminal 531 is connected to terminal 600 of microprocessor 70 and terminal 473 of microprocessor 30. Terminal 532 is connected to terminal 601 of microprocessor 70 and terminal 474 of microprocessor 30. Terminal 533 is connected to terminal 604 of microprocessor 70 and terminal 475 of microprocessor 30. Terminal 534 is connected to terminal 605 of microprocessor 70 and terminal 476 of microprocessor 30. Terminal 435 is connected to terminal 606 of microprocessor 70 and terminal 477 of microprocessor 30. A plurality of diodes 32, 33, 34 and 35 have their anode electrodes connected to terminals 532, 531, 530 and 529 respectively of plug-in receiving means 60 and their cathode electrodes connected to terminals 416, 415, 414 and 413 of keyboard 31 respectively.

A sound effects generating circuit 80 forms the subject matter of a U.S. patent application entitled Digitally Driven Audio Effects Generator, Ser. No. 220,403 filed on Dec. 29, 1980, and is assigned to the assignee of the present invention. Sound effects generating circuit 80 is described in detail therein. Circuit 80 includes a plurality of matrix resistors 516, 517, 518 and 519 are coupled to terminals 532, 531, 530 and 529 respectively of plug-in receiving means 60 and to a common junction. A resistor 500 couples common junction of the matrix resistors 516 through 519 to ground. A transistor switch 512 has an emitter electrode 513 connected to ground, a base electrode 514 coupled to terminal 527 by a resistor 520, and a collector electrode 515 connected to the junction of the matrix resistors 516 through 519. An operational amplifier 502 has an inverting input 503, a non-inverting input 504 connected to the matrix resistor common junction, and an output terminal 505. A buffer transistor 507 has an emitter electrode 508 connected to terminal 503, a base electrode 509 connected to output terminal 505, and a collector electrode 510 connected to terminal 522 of plug-in receiving means 60. A resistor 506 and a speaker 511 are serially connected between emitter electrode 508 and ground.

Microprocessors 30 and 70 comprise National Semiconductor microprocessor units COP444L which are described in great detail in the publication MOS Data Book, 1980 issued by National Semiconductor Number at page number 1-115. Drivers 40, 41, 42 and 43 are of identical construction and each comprise National Semiconductor drivers Number MM58201. A description of the MM58201 is found at page 5-238 of the above recited book. It will be recognized by those skilled in the art that the detailed schematic set forth and described above together with the specifically recited microprocessor and display driver units form the basis of the detailed schematic shown in FIGS. 6A and 6B. It will be equally apparent, however, to those skilled in the art that numerous varieties of microprocessor units and display driver units of similar fabrication and construction and function to the above recited National Semiconductor units are available on standard components and may be utilized for the present invention system without departing from the spirit and scope of the present invention. In such case, of course, it will be equally apparent to those skilled in the art that some minor modifications of the specific electrical connections set forth in FIG. 6 would be required.

Given the above-described circuit elements and their relationships to one another and given the above-described flow charts, those skilled in the art will be able, without undue experimentation, to write the kinds of programs for implementing the preferred embodiment. It is therefore believed unnecessary to include or describe in detail any particular program listing in this specification. For the sake of convenience however the exemplary program listing (owned by Mattel, Inc.) which accompanies this application is expressly incorporated herein by reference and made a part of this application, see microfiche apparatus.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A teaching and entertainment device comprising:
   display means including a matrix of individually operable display cells, each of said display cells configurable into selected one of at least two image states and requiring periodic refreshing to maintain an imposed image state;
   a plurality of display drivers, each including a driver memory, periodically refreshing said display cells and each being coupled to and controlling a portion of said display means;
   information means for displaying a figure at a location on said matrix including portions of said matrix under control of two or more of said display drivers;
   a user operable keyboard;
   a first microprocessor, including first microprocessor memory means in which a predetermined coded program is stored, coupled to said first microprocessor memory means, said keyboard and said plurality of display drivers, said first microprocessor being operable in a dominant first mode, in which it periodically poles said keyboard and responds thereto in accordance with said stored program to carry forth computational and interactive teaching and entertainment activities and to alter the image upon said display means, and in a subservient second mode;
   a plug-in cartridge;
   a plug-in cartridge receiving means for receiving and making electrical connections to said plug-in cartridge;
   a second microprocessor, having second microprocessor memory means and housed within said plug-in cartridge, said second microprocessor being electrically compatible with said first microprocessor;
   means cooperating with said first microprocessor and said second microprocessor to establish a master-slave relationship between said first and second microprocessors whenever said plug-in cartridge is received by said plug-in receiving means in which said first microprocessor is switched from operation in said dominant first mode to operation in said subservient second mode and transfers system preimmenance to said second microprocessor and in which said first microprocessor polls said keyboard, presents information to said second microprocessor, and responds to commands therefrom; and
   clock means, coupled to said first and second microprocessors, providing a common periodic clock signal.

2. A teaching and entertainment device as set forth in claim 1 wherein said first microprocessor includes means for determining the presence of said second microprocessor.

3. A teaching and entertainment device as set forth in claim 2 wherein said first microprocessor includes means, responsive to said means for determining the presence of said second microprocessor, changing the operation of said first microprocessor in response to the presence of said second microprocessor.

4. A teaching and entertainment device as set forth in claim 3, wherein said information means include address means for establishing a multiplexed address for each of said display cells in which the address of each display cell is defined by a three portion argument.

5. A teaching and entertainment device as set forth in claim 4 wherein said plurality of display devices include four drivers and wherein said display matrix portions comprise display quadrant portions of said display means.

6. A teaching and entertainment device as set forth in claim 5 wherein each of said display drivers control a selected one of said display quadrants.

7. A teaching and entertainment device as set forth in claim 6 wherein said address means includes means dividing the addresses of each of said cells in said matrix in a manner whereby said three portion argument includes a first portion defining a quadrant, a second portion defining a three-column group within said quadrant, and a third portion defining a cell position within said three-column group.

* * * * *